April 21, 1959  A. SCHINDEL  2,882,922
PRESSURE FLUID SYSTEM RELIEF VALVE
Filed Jan. 14, 1954
FIG. 1
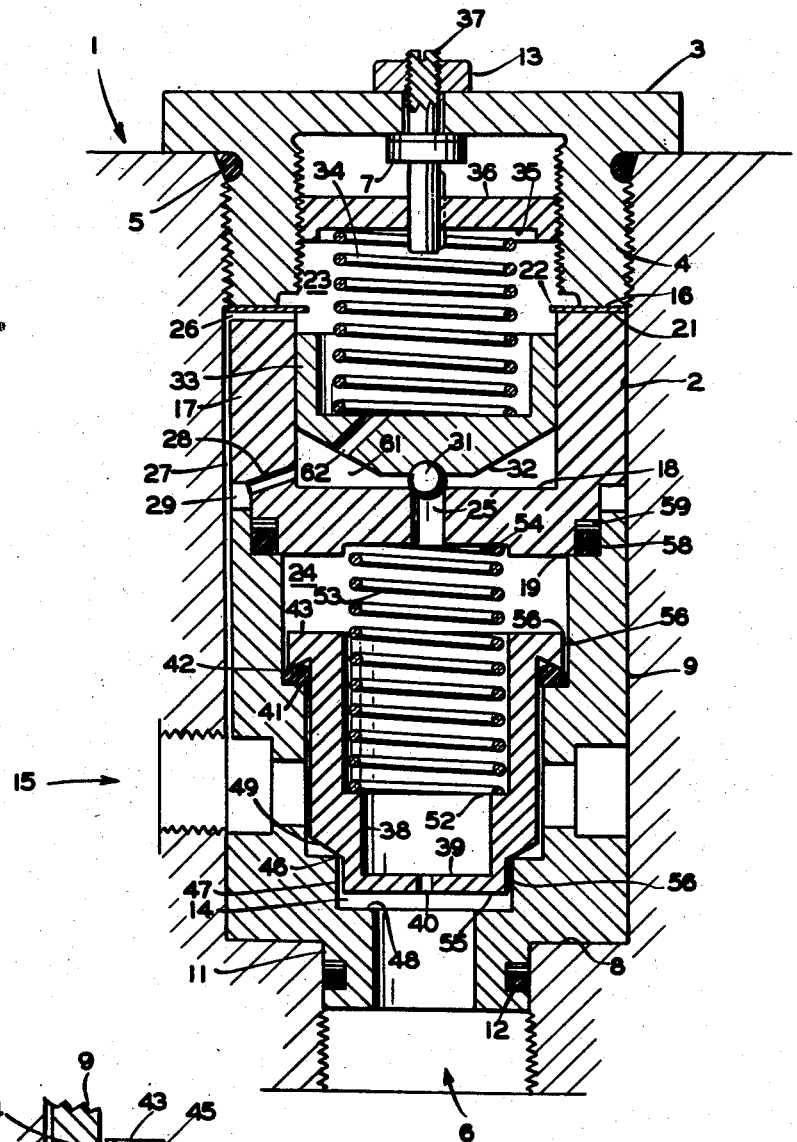
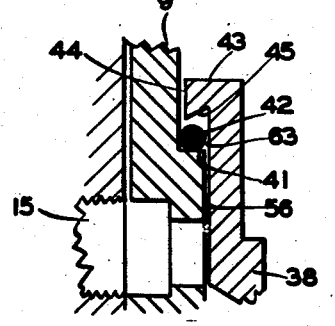
FIG. 2
INVENTOR.
ARNOLD SCHINDEL
BY
ATTORNEY

United States Patent Office 2,882,922
Patented Apr. 21, 1959

2,882,922

PRESSURE FLUID SYSTEM RELIEF VALVE

Arnold Schindel, Fairlawn, N.J., assignor to Bendix Aviation Corporation, Teterboro, N.J., a corporation of Delaware Application January 14, 1954, Serial No. 404,062

4 Claims. (Cl. 137—491)

This invention relates to a pressure fluid system relief valve. More particularly, it is concerned with a pilot operated main relief valve that is of practical use in maintaining desired pressure limits in a pressure fluid system.

A general object of the invention is to provide new and useful improvements in pilot operated pressure relief valves.

A further object of the invention is to provide a relief valve that is sensitive to overpressures in a high pressure fluid system and which will operate without appreciable friction or chatter.

Another object of the invention is to provide a non-chattering and a practical relief valve that is rapidly responsive to minimum pressure variations to bypass large volumes of fluid in a high pressure fluid system.

A still further object of the invention is to provide a pilot operated relief valve of a simple and practical nature that will serve to efficiently maintain a constant fluid pressure in a fluid pressure system.

Another object is to provide a pressure relief valve of a practical nature that will find particular use in association with the lubrication pump system of a jet aircraft engine.

The invention further lies in the general arrangement and peculiar organization of its various components as well as in their cooperative association with one another.

The foregoing and other objects and advantages of the invention will appear more fully hereinafter from a consideration of the detailed description which follows, taken together with the accompanying drawings, wherein one embodiment of the invention is illustrated. It is to be expressly understood, however, that the drawings are for the purposes of illustration and description, and are not to be construed as defining the limits of the invention.

In the drawings, wherein a relief valve embodying the invention is illustrated:

Fig. 1 is a vertical section therethrough; and

Fig. 2 is a detail of the ring seal arrangement when the main poppet is clear thereof.

In the drawings, there is shown a valve housing or holder 1 having an enlarged cylindrical axial bore 2 therethrough. The top end of the bore is closed over by a cap 3 having a depending skirt 4 which is threaded into the bore 2 and sealed therein by an O-ring 5. At the opposite end of the bore and communicating coaxially therewith is an inlet passage 6. The outer portion of the inlet is adapted for connection to a fluid pressure supply line. The bore 2 is relatively larger than the inlet passage 6, and where the two meet a shoulder 8 is formed. On the latter is seated a tubular element 9 which lines the lower part of bore 2 and is open at both ends. The lower end of element 9 is provided with a short neck 11 which extends into and lines the upper portion of the inlet passage. The neck 11 is sealed in the inlet by an O-ring 12 that is suitably carried in the periphery of the neck.

Inlet 6 communicates with the interior 14 of tubular element 9, and the interior of the latter communicates with a relief port 15 through its wall. The relief port is adapted for connection to a drain line not shown.

In that part of bore 2 between the end wall 16 of the cap skirt and the upper end of element 9, is another liner 17. The latter is open across its top, and it is closed over at its bottom by a wall 18. The latter wall rests upon the edge of an interior annular step 19 of element 9.

The end wall 16 of cap skirt 4 limits against end wall 21 of the upper liner 17 and serves to hold both the latter and liner 9 in their respective positions. A rigid washer element 22 is contained between the end wall of the cap and the upper wall of the liner and slightly overhangs the interior of the upper liner.

The bottom wall 18 of liner 17, together with the cylindrical walls of both liners 17 and 18 provides an upper chamber 23 and a lower chamber 24. The latter communicates with the upper chamber by means of an axial orifice 25 through the separating wall 18. The upper chamber communicates with a narrow passage 26 over the top of the upper liner wall, which passage descends at 27 along the outer walls of both liners and leads into the relief port 15. An orifice 28 through the lower portion of the wall of upper liner 17 communicates the upper chamber 23 with an annular channel 29 about its periphery that leads into the descending passage 27.

The axial orifice 25 of the upper liner is closed over by a ball 31 carried in the apex end of a frustro conical headed valve element 32. The latter is provided with an upwardly extending skirt wall 33. The extent of upward movement of valve 32 is limited by the overhanging washer element 22. The ball head 31 is normally seated on the orifice 25 to seal the latter by means of the tension of a coil spring 34 carried at one end within the valve skirt 33 and contained at the other end in a recess 35 in the underside of a disc 36. The latter is threaded into the skirt of the cap 3.

A set screw element 37, provided with a seal washer 7 and a lock nut 13, extends axially through the cap and the disc element. The set screw serves as a means of adjusting through the disc 36 tension of the spring 34 upon valve head 32. To this end element 37 is vertically slidable through cap 3 and disc 36 though it is not rotatable in the disc. In adjusting the position of disc 36, the element 37 is rotated to thread the disc to a desired position, it is then lifted to bring the washer 7 into sealing contact with the underside of the cap. The position of the element 37 is then locked by tightening the nut 13.

The inlet passage 6, which extends axially through the lower liner 9 and communicates with the lower chamber 24, is sealed by a main piston or poppet valve 38 so as to block direct communication thereof with the relief port.

Poppet 38 is provided with a cylindrical wall which is open over at its top end. It is closed over at its bottom by a wall 39, except for a narrow orifice 40 axially thereof.

The poppet is adapted to move up and down within the interior of the liner 9 in its seating and unseating movements and it is guided in the movements by the interior wall of the liner. The poppet is of peculiar formation, whereby many of the advantages of the valve are derived. To accommodate the particular form of the poppet and to enable the functioning thereof, the inner wall of the liner 9 is stepped in about midway thereof to provide a shoulder 41 on which is carried an annular sealing ring 42 of resilient material, such as rubber or the like. The poppet is provided with an annular flange 43 at its top. The outer wall 44 of the flange is slightly clear of the liner wall, and the under wall 45 of the flange rests upon the sealing ring. A little below the lower part of the relief port 15, the inner wall of the lower liner 9 is again stepped in to provide an edge 46. The descent of the riser wall 47 from edge 46 continues a short distance to where it steps in to provide a shoulder or step 48 that surrounds the inlet 6. The outer wall of the poppet descends to a point slightly above the step 46 where it is provided with a frustro conical portion 49. The conical portion seats upon the annular edge of step 46 and there it blocks direct communication of the inlet passage 6 with the relief port 15.

The poppet is provided with an interior shoulder 52 on which limits a coil spring 53. The other end of the spring limits in an axial retaining recess 54 in the underside of wall 18. The spring constantly tensions the poppet downward to seating position. The poppet is provided with a section 55 that descends from the end of the conical portion 49. This extended section projects into the lower stepped-in part of chamber 24 and has a normal position that is spaced a little above the inlet 6.

A slight clearance 56 separates the outer portions of the poppet wall from the adjacent inner wall of liner 9. The poppet seals at two points, one where the conical head 49 rests upon the step edge 46, and the other where the underside 45 of the flange rests upon the seal ring 42; the poppet is otherwise clear of the adjacent liner wall.

The load of springs 34 and 53 upon their respective valve heads is such that the upper valve 32, also called the sensing valve, will crack first to provide relief through the liner passage 27 to the drain. This relief will occur upon a predetermined maximum pressure of fluid passing from the inlet 6 and through the narrow orifice 40 to the upper part of chamber 24. When the maximum pressure has been exceeded the lower valve 38 will crack and provide direct relief in large volume from the inlet to the lower chamber and from the latter directly to the relief port.

To further explain the operation of the invention, as fluid at a pressure below the cracking point of the lower valve enters the inlet passage, it passes into chamber 24 and then through the narrow orifice 40 into the portion of chamber 24 above the poppet. It cannot escape from chamber 24 to the relief port 15 because of the closed main valve 38 as well as the seal ring 42. It cannot escape to the liner drain passage 27 because of a seal provided by an O-ring 58. The latter is carried on the shoulder 19 of the liner 9 and is pressed between the shoulder wall thereof and a stepped wall 59 of the upper liner.

As the pressure fluid reaches maximum pressure the upper valve head cracks and rises slightly, whereupon pressure fluid passes into the chamber space 61 beneath the conical portion of the valve. From here some of the pressure fluid escapes through the communicating port 28 to the drain passage 27; and some of the pressure fluid passes through an orifice 62 to the chamber space above the valve head where it relieves through passage 26 to the drain port 15.

As the pressure load is increased, sufficient pressure drop is achieved across the main poppet 38 to lift it against its spring load, allowing it to rise clear of its seat 46 and to permit direct relief to the drain port 15. Further increase in the pressure load results in a greater rise of the poppet, the sensing poppet, however, rises only slightly farther, being limited in the extent of its rise by the overhanging washer 22. With the further rising of the main poppet, the flow from inlet 6 to relief port 15 is in substantial volume.

It is to be noted, that as the main poppet rises slightly and lifts clear of the O-ring 42, the latter relaxes and seeks the inner diameter of the wall of liner 9, as indicated in Fig. 2. When this happens, because of the existing slight clearance 56 between the poppet 38 and liner 9, as well as because of a slight clearance 63 between the poppet and the O-ring, the poppet is freed of any friction load in its further movement. As fluid inlet pressure is lowered, the main poppet again seeks its seat and is guided in this movement by the projecting lower end 55 thereof in cooperation with the adjacent liner wall. As the poppet descends to seating position, the under wall 45 of flange 43 presses down upon the O-ring and, because of an upwardly and inwardly slanting disposition of the under wall 45, the latter forces the O-ring downward upon shoulder 41 and radially inward against the wall of the poppet to seal against any leakage around the wall of the poppet to the drain port, as in Fig. 1.

It is also noted that the main poppet is chatter free as it reaches the point of cracking and as it begins to rise. This is primarily due to the limited point of contact formed by the step edge 46 with the poppet conical head 49. As the poppet rises, it fully clears the seat edge 46 and allows a flow around the poppet to the drain. It thereby avoids chattering which would otherwise occur were the seating contact substantially greater. Chattering and pounding is further prevented by the flange 43 which is cushioned by the resilient O-ring as the valve approaches its seat.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

What is claimed is:

1. In a valve of the character described, a valve chamber having a substantially sharp annular step edge forming a seat about an inlet port, a cylindrical valve element having a conical head at its bottom adapted for engagement with the seat and having an annular flange about its upper end, the chamber having a stepped portion providing an annular shoulder about the valve element, a deformable rubber-like O-ring carried on the shoulder and having an inner diameter slightly greater than that of the valve element, the flange adapted to rest upon the O-ring when the conical head is seated upon the seat, said flange having an inclined face extending downwardly from above the inner side of said O-ring and terminating in an edge in contact with the outer upper side of said O-ring, a spring load constantly tensioning the conical head into seating position whereby substantial direct communication of the inlet port with a large relief port in the side of the chamber is blocked, the valve head having a narrow orifice for allowing low pressure fluid flow to the interior of the chamber above the valve head, the valve element being slightly clear of the chamber wall at all points except where the head thereof contacts the valve seat, the edge of the annular flange about the valve exerting when the latter is seated a compressive force upon the O-ring sufficient to deform the latter into sealing contact with the chamber shoulder and the cylindrical wall of the valve element, whereby the chamber wall is sealed against reverse fluid flow from the chamber to the side relief port, the chamber having a valve controlled narrow escape port adapted to relieve low pressure flow from the chamber upon such pressure reaching a certain value, the cylindrical valve element adapted to unseat upon the fluid pressure through the inlet port reaching a certain maximum value, said edge arranged to permit said O-ring to be free of contact with said valve element when it unseats, and the valve element adapted to rise substantially without friction load on becoming unseated and to provide substantially direct communication between the inlet port and the large relief port.

2. A chatter free valve comprising: a cylindrical valve chamber having an inlet port through one end thereof and an outlet port in the side wall thereof, a cylindrical valve member slidable in the chamber in close spaced relation to the wall thereof and having a conical head adapted to seat upon the edge of a right angled step formed about the inlet port, a short extension depending from the conical head of the valve and projecting into the inlet port in close spaced relation to the wall of the latter, an annular step extending radially outward from the inner wall of the chamber, a deformable O-ring carried upon the step and having an inner diameter slightly greater than that of the valve member, a flange radially extending around the upper end of the valve member, the flange overhanging the O-ring and having its peripheral wall in close spaced relation to the radially stepped wall of the chamber, spring means loading the valve head into engagement with the seat edge and loading the flange into compressing engagement with the O-ring, the underside of the flange having an inwardly and upwardly disposed face and an outer edge arranged when the valve head is seated to force the O-ring radially into contact with the cylindrical wall of the valve member and to press it down upon the annular step, and the O-ring adapted to reform free of contact with the valve member as the valve member is unseated, whereby such arrangement the valve member is cushioned in its engagement with the seat.

3. Means for relieving excessive pressure from a high pressure fluid system, comprising a housing including a cylindrical chamber having an inlet port at one end adapted for connection in a line of the pressure system and having a large side relief port, an annular shoulder about the inlet opening including an edge forming a valve seat, a cylindrical valve element adapted for slidable movement in the chamber in close spaced relation to the wall of the chamber and having a conical head adapted to engage with the valve seat edge to block direct communication of the inlet port with the large relief port, a spring normally tensioning the valve head upon its seat, the chamber having a valve controlled narrow escape port for low pressure fluid entering the chamber and the valve head having a narrow port adapted to pass low pressure fluid to the interior of the chamber, the valve head adapted to rise against the load of the spring clear of the seat edge and to immediately provide a direct communication of the inlet port with the large side relief port upon a certain maximum fluid pressure passing through the inlet port, a short cylindrical section continuing from the conical head and projecting partway into the inlet port in close spaced relation to the wall of the latter, the short cylindrical section serving as a guide to the value head in the engagement of the latter with its seat, said chamber including an annular step about its wall, a deformable O-ring carried on the step and surrounding the cylindrical wall of the valve element, the O-ring having an inner diameter slightly greater than that of the valve element so as to be free of the latter when the latter moves from the valve seat, the valve element having an annular flange at the end opposed to the valve head adapted, when the valve element is tensioned in engagement with its seat, to rest upon the O-ring and to exert a compressive force thereon, and the underside of the flange having an inwardly and upwardly disposed face and edge which overhangs the top of the O-ring, said overhanging edge being constructed to push the O-ring radially into sealing contact with the wall of the valve element and to force it against the annular step when said valve head is seated, whereby the interior chamber is sealed against reverse flow therefrom between the valve element and the chamber wall and said edge arranged to permit said O-ring to reform free of contact with the valve element when it unseats.

4. In a valve of the character described, a valve structure comprising a valve chamber having a substantially sharp annular step edge forming a seat about an inlet port, a cylindrical valve element having a conical head at its bottom adapted for engagement with the seat and having an annular flange about its upper end, the chamber having a stepped portion providing a shoulder about the valve element, a resilient O-ring carried on the shoulder and in contact with the wall of said chamber and having an inner diameter slightly greater than that of the valve element, the bottom of said flange being inclined downwardly in an outward direction and terminating outwardly in a sharp annular edge which overhangs the uppermost part of said O-ring, the edge of the flange being adapted to urge said O-ring inwardly into contact with the surface of said valve element when the conical head of the valve element is seated upon the valve seat, said edge being arranged to free said O-ring from contact with said valve member when the latter unseats, the valve element having a slight clearance between it and the surrounding wall of the chamber at all points except where the valve head contacts the seat, and a spring load normally tensioning the valve into seating position, whereby the valve element in accordance with inlet fluid pressure is moved to and from its valve seat free of the friction load of the O-ring.

References Cited in the file of this patent
UNITED STATES PATENTS

| | | |
|---|---|---|
| 314,649 | Campbell | Mar. 31, 1885 |
| 449,161 | Lacy | Mar. 31, 1891 |
| 934,083 | Mills | Sept. 14, 1909 |
| 2,351,871 | Parker | June 20, 1944 |
| 2,470,800 | Ashton | May 24, 1949 |
| 2,537,249 | Walton | Jan. 9, 1951 |
| 2,552,892 | Garrett | May 15, 1951 |
| 2,638,243 | Davies | May 12, 1953 |

FOREIGN PATENTS

| | | |
|---|---|---|
| 38 | Great Britain | of 1870 |